United States Patent [19]

Vulliez

[11] Patent Number: 5,329,746
[45] Date of Patent: Jul. 19, 1994

[54] DEVICE FOR PACKING PROTECTED ARTICLES FOR USE IN PARTICULAR WITH FOODSTUFFS INTO PROTECTIVE BAGS

[76] Inventor: Henri Vulliez, Moulin de Butteaux - Flogny-la-Chapelle, 89360 Butteaux, France

[21] Appl. No.: 926,696

[22] Filed: Aug. 10, 1992

Related U.S. Application Data

[62] Division of Ser. No. 641,535, Jan. 15, 1991, Pat. No. 5,161,691.

[30] Foreign Application Priority Data

Jan. 18, 1990 [FR] France ................... 90 00961
Apr. 11, 1990 [FR] France ................... 90 04674

[51] Int. Cl.$^5$ ............... B65B 9/02; B65B 15/00; B65B 35/16
[52] U.S. Cl. .................... 53/111 R; 53/127; 53/128.1; 53/553; 53/373.7; 29/527.1
[58] Field of Search ............. 53/553, 552, 244, 373.7, 53/128.1, 236, 111 R, 127; 29/527.1

[56] References Cited

U.S. PATENT DOCUMENTS

| | | |
|---|---|---|
| 234,633 | 11/1880 | Way . |
| 2,773,530 | 12/1956 | Sullivan . |
| 3,338,023 | 8/1967 | Lazenby ................. 53/553 X |
| 3,411,263 | 11/1968 | Smolderen ............. 53/553 X |
| 3,664,020 | 5/1972 | Hammond et al. . |
| 3,675,323 | 7/1972 | Braginetz . |
| 4,010,596 | 3/1977 | Osterholt ................. 53/244 X |
| 4,138,014 | 2/1979 | Bouman . |
| 4,204,824 | 5/1980 | Paradis . |
| 4,544,519 | 10/1985 | Schilke . |
| 4,582,353 | 4/1986 | Alvernhe . |
| 4,709,532 | 12/1987 | Taylor ................... 53/552 X |
| 4,814,134 | 3/1989 | Brown . |
| 4,896,424 | 1/1990 | Walker . |
| 4,901,503 | 2/1990 | Gomez et al. .......... 53/244 |

FOREIGN PATENT DOCUMENTS

| | | |
|---|---|---|
| 182514A1 | 5/1986 | European Pat. Off. . |
| 218101A1 | 4/1987 | European Pat. Off. . |
| 447697 | 1/1913 | France . |
| 1264265 | 5/1961 | France . |
| 2254419 | 7/1975 | France . |
| 11652 | of 1911 | United Kingdom . |
| 256464 | 8/1926 | United Kingdom . |
| 2187989 | 9/1987 | United Kingdom . |

OTHER PUBLICATIONS

G. R. Langecker, "Automatisierungen im Spritzgiessbetrieb", Oct. 10, 1983, Kunststoffe, vol. 73, pp. 559-563.

"Automatisierungen im Spritzgiessen und Verpacken von Bestecken", Feb. 2, 1989, Kunststoffe, vol. 79, p. 136.

P. Spamer, et al.,: "Flexibles Fertigungszentrum fur das Spritzgiessen . . . ", Sep. 9, 1984, Kunststoffe, vol. 74, pp. 489-490.

Primary Examiner—Horace M. Culver

[57] ABSTRACT

A device for handling molded articles of manufacture, for use in particular with foodstuffs, such as forks or knives, and for placing the articles into protective bags or like packaging or wrappings. The device includes robots adapted to grip the molded articles prior to or upon their ejection from a mold and to convey and carry the articles to a machine which packages the articles into the protective bags.

8 Claims, 4 Drawing Sheets

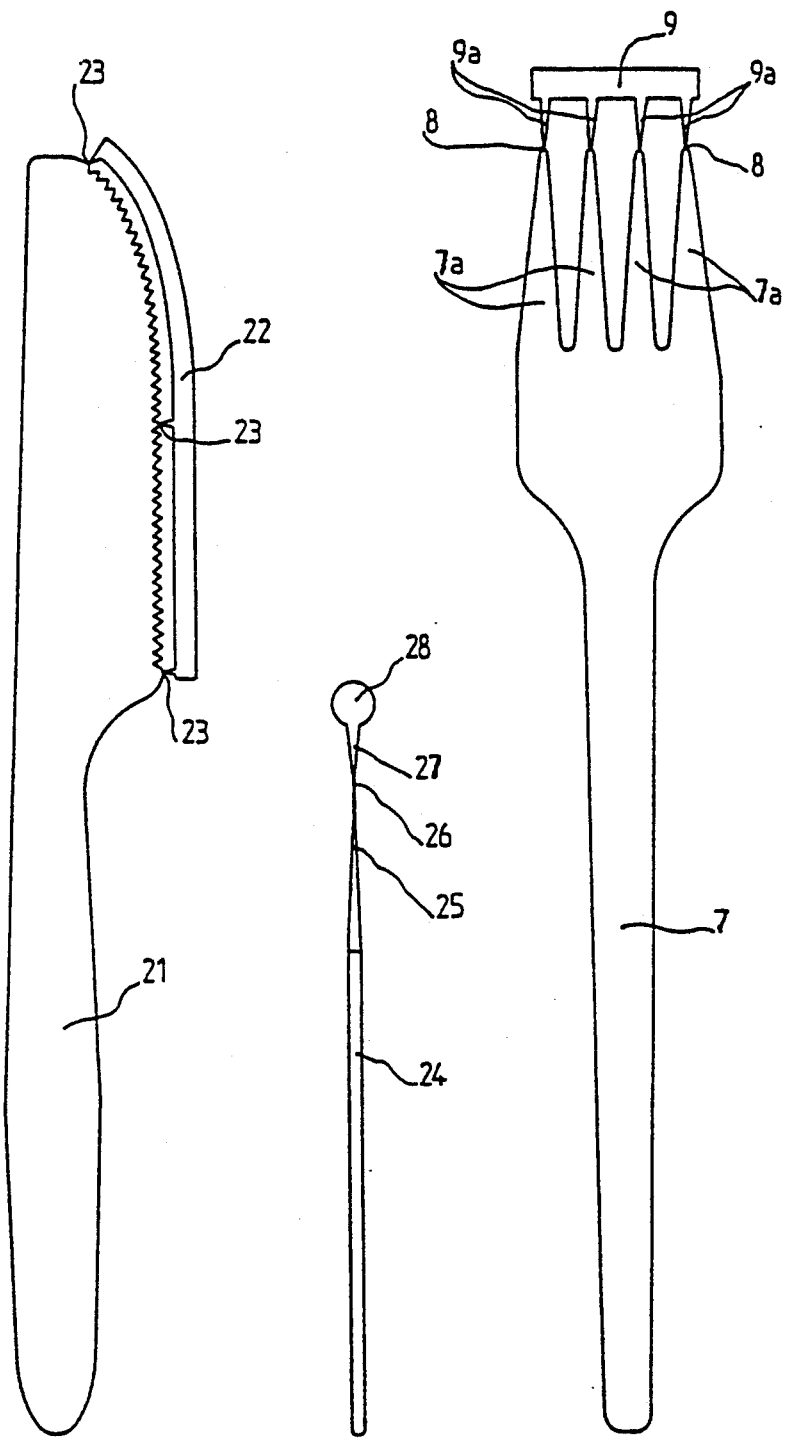

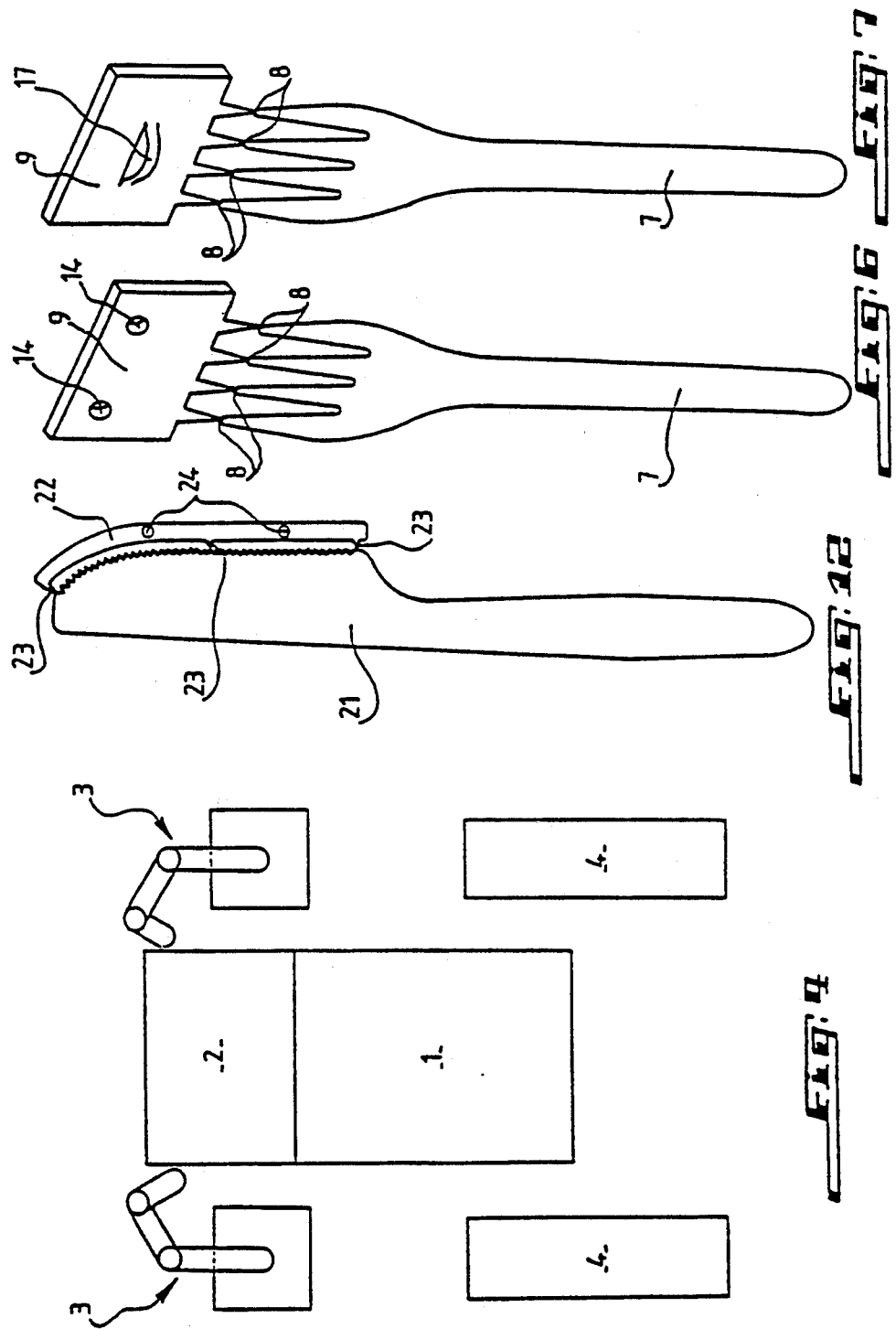

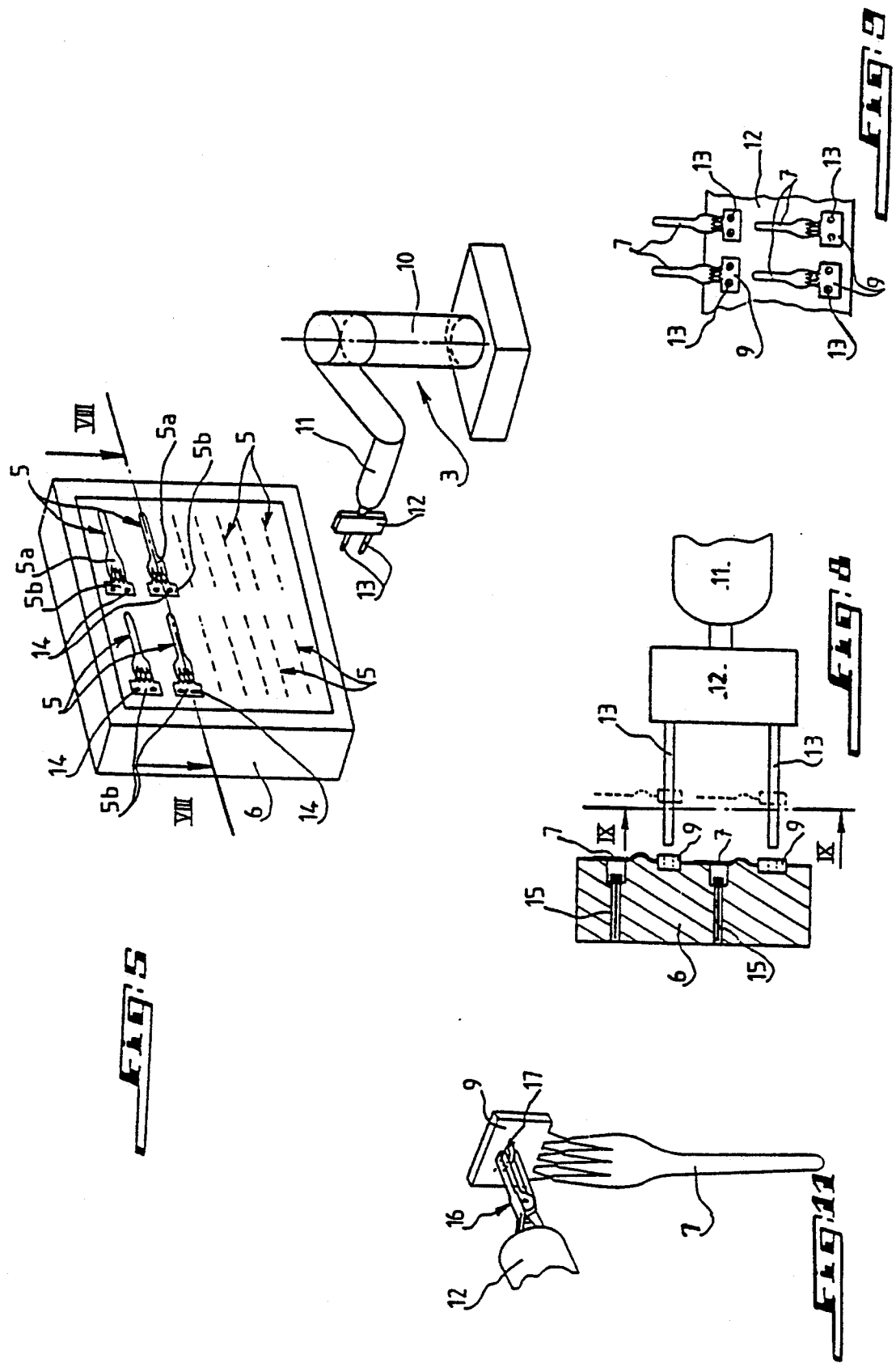

DEVICE FOR PACKING PROTECTED ARTICLES FOR USE IN PARTICULAR WITH FOODSTUFFS INTO PROTECTIVE BAGS

This is a division of application Ser. No. 07/641,535, filed Jan. 15, 1991, now U.S. Pat. No. 5,161,691.

BACKGROUND OF THE INVENTION

1. Field of the Invention

The present invention relates to a device for protecting articles of manufacture for use in particular with foodstuffs, such as forks, knives, spoons, pins or toothpicks for hors-d'oeuvres, which are used only once, and more particularly, to a device for handling such articles and placing the articles into protective bags.

2. Description of the Prior Art

Forks, knives, and spoons are presently supplied in a state without any protective covering and offer no protection against cuts or gashes or pricks which they may cause and especially without any guarantee that the articles have not been previously used. This also holds true for forks, knives and spoons packed in bags, since nothing guarantees that the articles have not already been used before having been placed in their respective bags.

SUMMARY OF THE INVENTION

The present invention overcomes the above-mentioned inconveniences by providing a device for protecting articles of manufacture for use with foodstuffs, by not only providing protection from pricks and cuts or gashes they may cause, but also to guarantee only a single and sole use of each article.

The invention comprises a protecting member connected directly to the sharp-pointed or keen-edged portion of the article, protecting at least the breakable point of the article, the protecting member being separable from the article when using the latter.

In the case where the article is a pin or toothpick, the protecting member has the shape of a ball connected to the sharp-pointed portion of the pin or toothpick by a narrowed portion forming the aforesaid breakable point.

In the case where the article is a fork, the protective member has the shape of a strip connected to the tips of the prongs of the fork by narrowed points forming frangible points.

In the case where the article is a knife, the protective member has the shape of a strip connected to the cutting or keen-edge of the knife by one or several narrowed points, each one forming a breakable point.

Each article, and the protecting member which is associated therewith, are made in a single piece by injection or compression molding.

The articles and their associated protective members are made from a plastic material.

The invention is also directed to a device for handling molded articles of manufacture for use in particular with foodstuffs, such as forks or knives to place the articles into protective bags or like packagings or wrappings.

Such articles are typically formed by molding a plastic material, such as polypropylene, polystyrene or polycarbonate, injected into corresponding cavities or impressions of a metal mold of the hot-runner type including a vertical parting plane along both parts of the mold. Thus, after opening both parts of the mold, the molded articles are ejected simultaneously from their respective molding cavities and fall down into a receiving or collecting container, wherefrom they are then recovered by hand for being placed, either by hand or automatically into protective bags.

However, when a plurality of articles fall into the receiving container, the articles in particular forks having prongs, often become intermeshed with each other and the operator must separate the articles, thus incurring the risk of breaking the prongs of some articles, before placing them into protective bags.

The present invention further overcomes the above-mentioned inconveniences by providing a device for the handling of molded articles, in particular articles for use with food products, such as forks, or knives, to place them into protective bags. The device comprises gripping means adapted to separately grip the molded articles prior to or upon their ejection from the mold and to convey or carry the articles into the protective bags.

Each molded article comprises a part for the protection of the active or operative portion of the article, removably connected thereto through at least one frangible point, with the protective part including at least one means for allowing the aforesaid gripping means to grasp the article.

Advantageously, the gripping means comprise at least one robot having an arm and wrist for the simultaneous gripping of the aforesaid molded articles.

According to one embodiment, the wrist comprises pliers or nippers allowing the molded articles to be gripped before the ejection of the latter, each article having a molded protrusion on the protecting part which is grasped by the pliers or nippers.

According to a second embodiment, the wrist comprises parallel gripping rods arranged in front of openings of the protecting parts, respectively, which allow the articles to be gripped. The articles can be placed onto their respective rods by the protecting parts upon the ejection of the articles from the mold.

Preferably, each protecting part comprises two openings allowing an article to be placed, respectively, onto two gripping rods.

Advantageously, the gripping means comprise two similar robots having arms and wrists for successively gripping two groups of molded articles, respectively. One of the robots conveys one gripped group of molded articles towards the packing machine, whereas the other robot grips and conveys the other group of molded articles.

Each robot is adapted through pivoting to penetrate between both parts of the mold having a vertical parting plane to grasp the molded articles and to disengage itself from these two parts in order to carry the articles towards the packing machine.

The gripping means convey the gripped molded articles to a storage station where they are again gripped by another gripping means, preferably constituted by a robot with a gripping arm and wrist, in order to be brought to the packing machine where they are placed either one by one or in a plurality into the protective bags.

Advantageously, each protective bag is heat-sealed by ultrasound or high frequency to the protective part of the article.

Each protecting part consists of a plate connected to the active or operative portion of the molded article by hammered out portions.

BRIEF DESCRIPTION OF THE DRAWINGS

The invention will be better understood and further objects, characterizing features, details and advantages thereof will appear more clearly, as the following explanatory description proceeds with reference to the accompanying drawings given by way of non-limiting examples, illustrating only several embodiments of the invention and wherein:

FIG. 1 shows a fork provided with a protective device according to the invention;

FIG. 2 shows a knife also provided with a protective device according to the invention;

FIG. 3 shows a pin or toothpick for hors-d'oeuvres provided with a protecting device according to the invention;

FIG. 4 diagrammatically shows a plant for the molding of articles and their automatic handling and packing into protective bags;

FIG. 5 is a perspective view showing gripping means associated with an open mold for gripping molded articles;

FIG. 6 shows an enlarged view of a fork to which is connected a protecting plate, according to a first embodiment of the invention;

FIG. 7 is a view like that of FIG. 6, but showing a second embodiment of the protective plate;

FIG. 8 is a view in cross-section taken along the line VIII—VIII of FIG. 5;

FIG. 9 is a view in cross-section taken along the line IX—IX of FIG. 8;

FIG. 11 shows another embodiment of the means for gripping the molded articles; and FIG. 12 shows a knife as a molded article which may be grasped by gripping means according to the invention.

DESCRIPTION OF THE PREFERRED EMBODIMENTS

Figure 10:
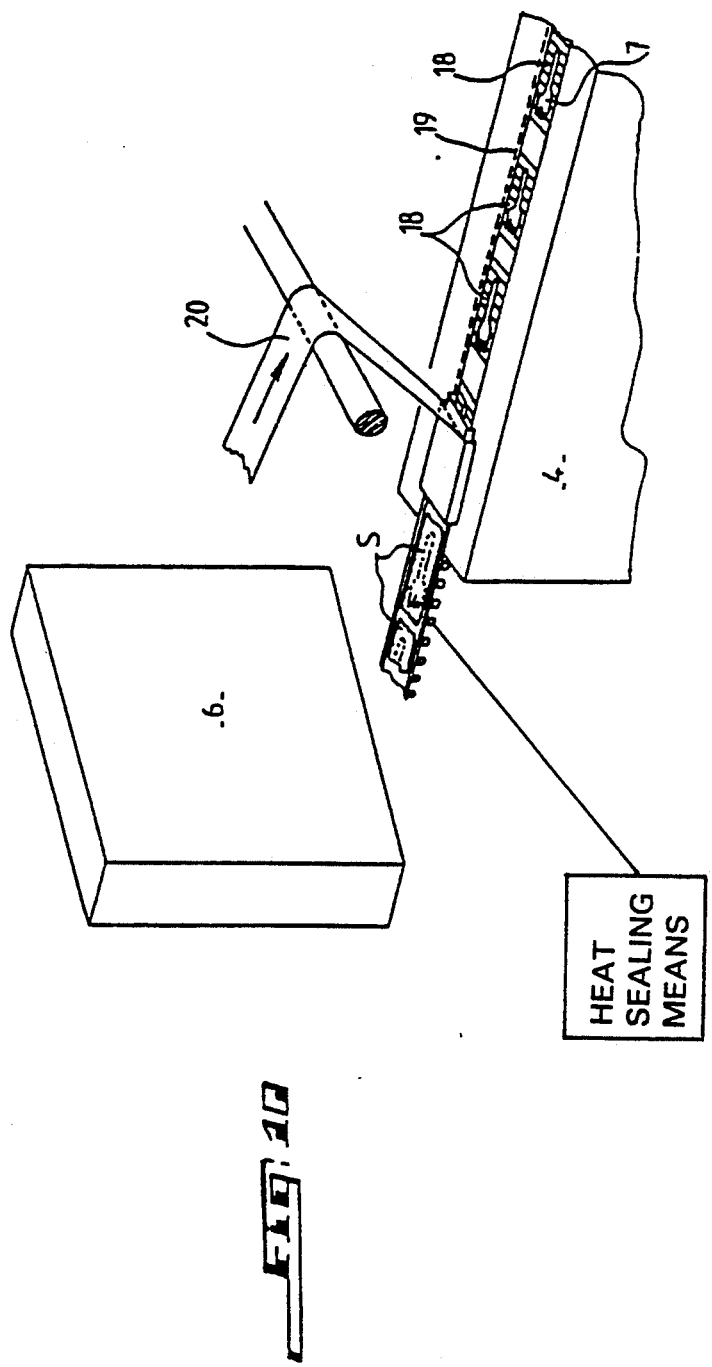
FIG. 10 is a partial perspective view of a packing machine.

FIG. 1 shows a fork 7 made from a molded plastic material, such as polystyrene, polypropylene or polycarbonate. The prongs 7a of which are connected by their ends or tips to a protective member 9, shaped as a strip or plate made from a plastic material similar to that of the fork 7. The plate 9 comprises teeth 9a located along one side, the tips or ends of which are molded fast with the tips of the prongs 7a of the fork 7. Thus, the plate 9 is. connected to the prongs 7a of the fork 7 by narrowed breakable points, so that the plate may be separated or severed by a user by breaking the connection between the teeth 9a and the prongs 7a. Under such circumstances, the plate 9 would not only prevent any user from the hazard of being pricked by the prongs 7a of the fork 7, but also ensures that no prior use of the fork has occurred since the plate 9 will have been disconnected from the fork 7 if the fork had been used previously.

Similar above-mentioned results are obtained with the knife and the pin or toothpick shown in FIGS. 2 and 3, respectively.

In FIG. 2, the knife 21 has its keen or cutting edge protected by a strip 22 conforming to the shape of the cutting edge and connected thereto by two or more teeth-shaped frangible connections 23, forming narrow points. The knife 21 and the strip 22 are molded from the same plastic material.

The pin or toothpick 24 shown in FIG. 3 has its sharp-pointed tip 25 connected by a narrowed point 26 to the sharp-pointed end of a tapered portion 27 integral with a protecting ball 28. The pin or toothpick 24 and the protecting ball 28 are molded from the same plastic material.

The above-mentioned articles are made in one single piece in the same mold as well be explained later.

The junction point or points between the article and its associated protecting member is or are therefore narrowed to facilitate breakage when using the article. The non-use of this article is therefore guaranteed before any use by a consumer, since the breakage of at least one of the junction points advises the user that the article may have already been used and that he would rather refrain from using the article for health reasons.

FIG. 4 shows by way of example a plant for molding the articles, such as table forks, for gripping and removing the articles from their mold to place the articles automatically into protective bags. This plant allows these operating steps to be carried out at a very high rate and comprises a machine 1 for plasticizing and injecting the plastic material constituting the articles into a metal mold 2 with cavities or impressions which correspond to the shapes of the articles to be molded. Two robots 3 are arranged on either side of the machine 1 and mold 2 for grasping and removing the molded articles from the mold 2 and for carrying the articles towards the machine 4, respectively, which automatically packs the articles into protective bags, made for instance of cellophane.

The plant according to FIG. 4 will be described in more detail by FIGS. 5 to 12. For the sake of simplicity, one robot 3 for gripping the molded articles and for conveying them towards the packing machine 4 is shown.

The plasticizing-injection machine 1 is broadly known per se and will not be described herein in detail, otherwise than that it allows the molten material to be injected into the mold 2 which is of the kind having a vertical partition plane. The mold 2 is illustrated in FIG. 5 in the open position showing the various horizontal cavities or impressions 5 of one of the parts 6. The impressions 5 correspond to the shapes of the articles to be molded, and in the present case consist of table forks. By way of example, twenty cavities or impressions 5 may be provided and arranged in two rows of ten aligned cavities or impressions. Each impression 5 comprises an impression portion 5a corresponding to a fork and another rectangular impression portion 5b communicating with the impression 5a through narrowed or restricted channels. Each impression 5 thus allows a fork 7 to be molded, the prongs of which have their tips connected by frangible, hammered-out portions 8, respectively, to a protecting plate 9 manually separable or severable from the fork 7 by breaking the hammered-out portions 8. The provision of the protecting plate 9 would meet health or sanitary requirements by warranting that the fork is used for the first time by consumer.

The robot 3 is diagrammatically shown as comprising a vertical pivoting column 10 carrying an arm 11 with a gripping wrist 12, which may pivotally swivel along all three known axes.

According to a first embodiment, the wrist 12 of the robot 3 comprises parallel gripping rods 13 adapted to be positioned between both parts 6 of the open mold 2 and inserted into circular openings 14 in the protecting plates 9 which are formed when molding the forks 7. In this position, the rods 13 extend at right angles to the part 6 of the mold 2 carrying the molded forks. Preferably, each protective plate 9 comprises two vertically aligned openings or holes 14, which are engaged by the gripping rods 13 of the wrist 12 when each fork 7 is located within its respective impression in the mold. For the sake of simplicity, one set of overlying rods 13 has been shown for respectively gripping two forks, it being understood that in actual use there are provided as many pairs of rods 13 as there are pairs of openings or holes 14.

The manner according to which the various molded forks are gripped by the robot is performed as follows.

Once the forks 7 and their associated protective plates 9 have been molded, the mold 2 is opened and the robot 3 pivots about its vertical axis so as to bring its wrist 12 between both parts 6 of the mold 2. The robot 3 positions the wrist 12 so that the gripping rods 13 are in a confronting, registering relationship with and very close to the openings 14 of the plates 9. When the gripping rods 13 are properly positioned, the ejectors 15 of the mold 2 are actuated simultaneously so as to eject the forks 7 from the impressions 5 (see FIG. 8). The plates 9 are pushed simultaneously onto the gripping rods 13, respectively. The forks 7 are thus gripped separately by the rods 13 and maintained thereon horizontally. The robot 3 then withdraws the wrist 12 from between parts 6 of the mold 2 and conveys the gripped forks towards the packing machine 4.

According to a second embodiment, shown in FIGS. 7 and 11, the wrist 12 of the robot 3 includes a number of pliers or nippers 16, one of which is shown for the sake of simplicity, and which may simultaneously grasp the forks 7. For that purpose each fork 7 includes a projection or protrusion 17 formed during molding on the outer face of the protecting plate 9. Each protrusion 17 is grasped by a nipper or plier 16 and may be either vertical or horizontal, according to the position of the arms of the corresponding gripping nippers 16 extending in either a horizontal or vertical plane, see FIGS. 8 and 9. For gripping the molded forks, the robot 3 positions its wrist 12 so that the nippers 16 grip the protrusions 17, respectively, before the forks are ejected from impressions 5. Once forks 7 have been gripped, the robot 3 carries the fork towards the packing machine 4.

It is possible to use a single robot 3 for gripping the molded forks when the prescribed production rate is relatively small. However, in the case of a high production rate, it is preferable to use both robots 3. In the latter case, one of the robots 3 would convey one gripped group of forks towards the packing machine 4, while the other robot would be gripping the other group of molded forks. For reasons related to production rate, it is desirable that the gripped forks are not directly brought to the packing machine 4, but conveyed to a storage station located near the machine 4, where they are recovered by a third gripping robot which lays them down in lines or rows, respectively, onto aligned transport pallets 18, which are stationary with respect to one another and carried along or driven longitudinally, for instance, by a transmission chain or belt 19, powered or moved by an electric motor, see FIG. 10. When passing underneath a cellophane paper strip or web 20, each fork 7 is automatically wrapped by a cellophane paper strip to form a protective bag S. The machine 4, and more particularly the means allowing the forks to be placed into protective bags 5, are widely known and will not be described herein. Once the forks have been placed in the bags, they pass below a device adapted for welding, for instance, heat-sealing by ultrasound or high frequency, which welds one portion of the cellophane paper of the bag onto the protective plate 9. The welding or heat-sealing apparatus is also known per se and may be an integral part of the machine 4. The welding or sealing of the protective bag to the plate 9 compels the consumer at first to separate or sever the plate 9 from fork 7 before taking the latter out of its bag, so that the plate 9 remains inside of the bag. This avoids littering the environment with the severed plates 9, and especially prevents encumbrance and littering of the tables of restaurants and the like.

The device according to the invention has been described with reference to forks as the molded articles, but it should be understood that it is applicable also to knives 21. The cutting or keen-edge of each one of the knives is protected by a strip having a shape mating with or complementary to that of the cutting or keen-edge and connected thereto by two or more frangible connections 23. Each strip 22 would comprise either two openings 24, in the present case horizontally aligned when the knife 21 which is in a horizontal position within mold 2 and co-operating with two parallel rods 13, respectively, of the wrist 12 of the robot 3 for gripping the knife or a protrusion (not shown) gripped by a corresponding nipper 16 of the wrist 12, as set forth previously. Moreover, the articles to be gripped have been shown in a horizontal position in mold 2, but it is obvious that they may assume a vertical position. Lastly, each protective plate 9 may have a shape other than a rectangular one.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A device for packing molded plastic articles, such as forks and knives, into protective bags, wherein each molded article includes a flat part for protecting a portion of the molded articles and which is removably connected to a portion of the article by at least one frangible point, said portion of the article comprising, when said article is a fork, a plurality of prongs of said fork, and when said article is a knife, a sharp edge of said knife, the flat protecting part having graspable means for allowing the article to be easily grasped, said device comprising means for individually and mechanically gripping and conveying the articles from a mold, said gripping means comprising at least one robot having an arm and wrist for the simultaneous gripping of said graspable means of the protecting part of the molded articles, and for conveying the gripped molded articles to a packing means for being packed into the protective bags, and said packing means for packing the molded articles with their respective protecting parts into the protective bags including means for welding the protecting part of each article with the protective bag in which the article is enclosed through heat-sealing by ultrasound or high frequency.

2. A device according to claim 1, wherein said graspable means comprises a plurality of openings located in said protecting part, said robot wrist comprising a plurality of parallel gripping rods which are capable of being inserted into the openings of the protecting parts, so that the molded articles can be gripped upon the ejection of the articles from the mold.

3. A device according to claim 2, wherein each protective part includes two openings and said wrist includes two gripping rods which are received in the openings.

4. A device according to claim 1, wherein said gripping means comprise two separate robots having arms and wrists for successively gripping two groups of molded articles, respectively, one of the robots conveying one group of molded articles towards the means for packing, while the other robot is gripping the other group of molded articles.

5. A device according to claim 4, wherein said robot includes means for pivoting to penetrate the wrist between two halves of the mold for gripping the molded articles and to disengage the wrist from between the two halves for conveying the articles towards the means for packing.

6. A device according to claim 1, wherein said graspable means of the protecting part of each molded article comprises a protrusion, and said robot includes nippers for gripping the protrusions of the protecting parts, respectively, before ejection of the molded articles from the mold.

7. A device for packing molded plastic articles, such as forks and knives, into protective bags, wherein each molded article includes a flat part for protecting a portion of the molded articles and which is removably connected to a portion of the article by at least one frangible point, said portion of the article comprising, when said article is a fork, a plurality of prongs of said fork, and when said article is a knife, a sharp edge of said knife, the flat protecting part having graspable means for allowing the article to be easily grasped, said device comprising means for individually and mechanically gripping and conveying the gripped molded articles from a mold to a packing means for being packed into the protective bags, wherein said graspable means of the protecting part of each molded article comprises a protrusion, and said gripping means comprises at least one robot having an arm and wrist including nippers for the simultaneous gripping of said graspable means on the protecting part of the molded articles, and said packing means for packing the molded articles and the respective protecting parts into the protective bags including means for welding the protecting part of each article with the protective bag in which the article is enclosed through heat-sealing by ultrasound or high frequency.

8. A device for packing molded plastic articles, such as forks and knives, into protective bags, wherein each molded article includes a flat part for protecting a portion of the molded articles and which is removably connected to a portion of the article by at least one frangible point, said portion of the article comprising, when said article is a fork, a plurality of prongs of said fork, and when said article is a knife, a sharp edge of said knife, the flat protecting part having graspable means for allowing the article to be easily grasped, said device comprising means for individually and mechanically gripping and conveying the gripped molded articles from a mold to a packing means for being packed into the protective bags, wherein said graspable means of the protecting part of each molded article comprises a plurality of openings, and said gripping means comprises at least one robot having an arm and wrist including a plurality of parallel gripping rods which are capable of being inserted into the openings in the protecting parts for the simultaneous gripping of the molded articles upon ejection from the mold, said packing means for packing the molded articles with their respective protecting parts into the protective bags including means for welding the protecting part of each article with the protective bag in which the article is enclosed through heat-sealing by ultrasound or high frequency.

* * * * *